June 25, 1957  H. K. GLEASMAN  2,796,775
VARIABLE SPEED GEARING FOR HUB TYPE BICYCLE COASTER BRAKES
Filed Aug. 15, 1955  2 Sheets-Sheet 1

WITNESS:
Esther M. Stockton

INVENTOR.
Hollis K. Gleasman
BY
Clinton S. Janes
ATTORNEY

June 25, 1957 H. K. GLEASMAN 2,796,775
VARIABLE SPEED GEARING FOR HUB TYPE BICYCLE COASTER BRAKES
Filed Aug. 15, 1955 2 Sheets-Sheet 2

WITNESS:
Esther M. Stockton

INVENTOR.
Hollis K. Gleasman
BY
Clinton S. Janes
ATTORNEY

United States Patent Office 2,796,775
Patented June 25, 1957

2,796,775

VARIABLE SPEED GEARING FOR HUB TYPE BICYCLE COASTER BRAKES

Hollis K. Gleasman, Elmira, N. Y., assignor to Bendix Aviation Corporation, a corporation of Delaware Application August 15, 1955, Serial No. 528,151

5 Claims. (Cl. 74—751)

The present invention relates to variable speed gearing for hube type bicycle coaster brakes, and more particularly to gearing of this type in which the shift is controlled by means which are responsive to the rotary speed of the bicycle hub.

It is an object of the present invention to provide a novel multi-speed coaster brake which is normally in high gear, but which shifts into low gear responsive to forward actuation of the pedals while the hub is stationary or is rotating below a predetermined speed.

It is another object to provide such a device which, after being shifted into low gear will thereafter stay in low gear while being continuously propelled, irrespective of speed.

It is another object to provide such a device which will shift into high gear responsive to a slight back-pedalling movement while the hub is rotating above a predetermined speed.

It is another object to provide such a device which, after shifting into high gear, will stay in high gear while being continuously propelled irrespective of the speed of rotation of the hub.

It is another object to provide such a device which will shift down to low gear responsive to momentary relief of the driving load while the hub is rotating below a predetermined speed.

Further objects and advantages will be apparent from the following description taken in connection with the accompanying drawings in which.

Figure 1:
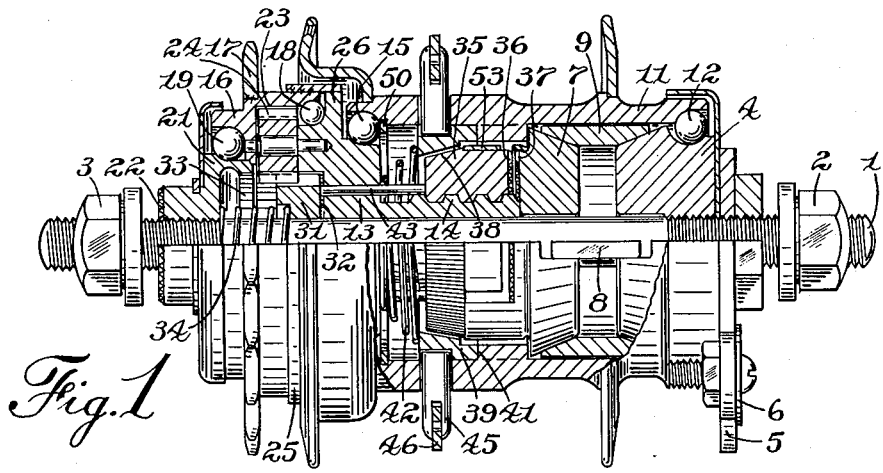
Fig. 1 is a side elevation, partly broken away and in section, of a preferred embodiment of the invention showing the parts in the positions assumed during high speed drive or coasting position.

In Fig. 1 of the drawing there is illustrated an axle 1 adapted to be clamped in the rear fork of a bicycle, not illustrated, by means of the clamp nuts 2 and 3. A brake anchor and bearing member 4 is adjustably mounted on the axle and prevented from rotation by a torque arm 5 the free end of which is connected to the bicycle frame by means of a clip 6. A brake actuating or expander member 7 is slidably mounted on the axle and non-rotatably connected to the anchor member 4 by means of keys 8. Arcuate brake shoes 9 are located between the anchor member 4 and expander member 7, said members being provided with conical engaging surfaces whereby movement of the expander member 7 toward the anchor member 4 causes the brake shoes 9 to be moved radially outward into frictional engagement with the interior of the hub 11 which is rotatably mounted on the anchor member 4 by means of bearings 12.

A transmission member 13 comprising a screw shaft 14 is rotatably mounted on the axle 1, and supports the hub 11 by means of a bearing 15. A driving member 16 having a sprocket 17 fixedly mounted thereon is rotatably supported on the transmission member 13 by means of a bearing 18, and is also rotatably mounted on the axle 1 by means of a bearing 19 carried by a clutch member 21 which is threaded on the axle and prevented from rotation by means of dentals 22 formed thereon and clamped to the bicycle frame by means of the clamp nut 3.

The driving member 16 is formed with an internal gear 23 which meshes with a plurality of planetary pinions 24 mounted on and carried by the transmission member 13; and a speed-change member in the form of a sun gear 31, also meshing with said planetary gears, is slidably mounted on the axle 1 for alternative engagement with sets of internal clutch teeth 32, 33 formed respectively in the transmission member 13 and the clutch member 21. A spring 34 normally maintains the sun gear 31 in engagement with the teeth 32 of the transmission member 13 as shown in Fig. 1.

A driving clutch and brake-applying member 35 is threaded on the screw shaft 14 and is provided at one end with dentals 36 for engagement with similar dentals 37 on the brake actuating member 7, and at its other end is formed with a conical clutch surface 38 adapted to cooperate with a similar surface in the interior of a driven clutch member 39 which is splined in the interior of the hub 11. The driven clutch member 39 is yieldably urged against a shoulder 41 in the interior of the hub by means of a spring 42.

Figure 2:
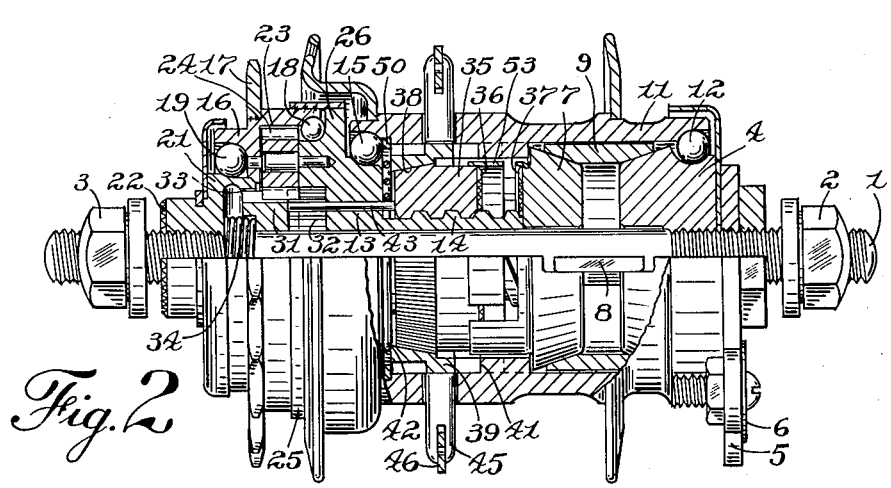
Fig. 2 is a similar view showing the parts in low gear driving position.

Means are provided whereby longitudinal movement of the driving clutch member 35 in a forward or clutch-engaging direction will shift the speed-change member 31 from its high speed position as shown in Fig. 1 to its low speed position in engagement with the teeth 33 of the clutch member 21 as shown in Fig. 2. As here shown, this means is in the forms of a plurality of thrust pins 43 slidably traversing the transmission member 13 and bearing at their ends against the driving clutch member 35 and the speed change member 31.

Figure 3:
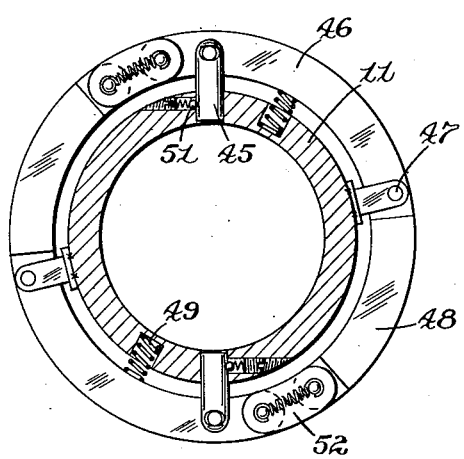
Fig. 3 is a detail, partly in side elevation and partly in section, of the centrifugal latches and their operating mechanism.
Figure 4:
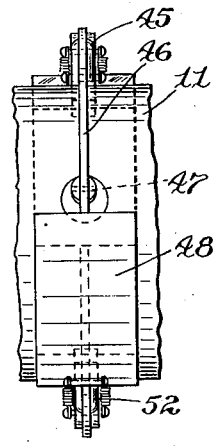
Fig. 4 is a side view of the structure shown in Fig. 3.

Means for preventing such shifting movement, so as to maintain the transmission in high gear while the hub is rotating above a predetermined speed is provided in the form of one or more latch members 45 mounted for radial sliding movement in the hub 11 and positioned to engage corresponding recesses in the driven clutch member 39 and thereby prevent its movement away from its high speed position. As best shown in Fig. 3, latches 45 are mounted on arcuate arms 46 which are pivoted to the exterior of the hub as indicated at 47, and are formed with weights 48 which are movable by centrifugal force to press the latches 45 inwardly. Springs 49 hold the latches 45 in retracted position when the hub is stationary or rotating below a predetermined speed, and detents 51 are preferably provided for controlling the movement of the latches 45 to prevent fluttering at or near the critical speed. Spring link members 52 are also preferably arranged to connect the end of the weight 48 of one arm 46 with the latch-carrying end of the other similar arm in order to counteract the effect of gravity on said weighted arms.

In operation, starting with the parts in the positions illustrated in Fig. 1, it is assumed that the bicycle is in motion above the critical speed so that the latches 45 are pressed inwardly by weights 48, and the driven clutch member 39 is thereby maintained in its high speed position. Forward rotation of the drive member 16 by the sprocket 17 is then transmitted to rotate the transmission member 13 at the same speed as the driving member since the planet pinions 24 are locked to the transmission member 13 by the sun gear 31 which is at this time engaged with the internal teeth 32 in the transmission member. Forward rotation of the transmission member 13 with its screw shaft 14 causes the driving clutch member 35 to move into engagement with and rotate the driven clutch member 39, this engaging movement being preferably ensured by means of a spring drag ring 53 fixedly mounted on the brake expander member 7 and having a light frictional bearing on the driving clutch member. The hub is therefore rotated at the same speed as the driving member 16.

When it is desired to shift into low gear, as when an upward grade is encountered, the speed of the vehicle is permitted to diminish below the critical speed, and the driving effort is momentarily relaxed. When this occurs, the springs 49 become effective to withdraw the latches 45 from the path of movement of the driven clutch member 39, whereupon resumption of pedalling by the rider causes the driving clutch member 35 to be traversed to the left until the driven clutch member 39 is arrested by a stop ring 50 in the interior of the hub 11. This movement of the driving clutch member is transmitted by the pins 43 to the speed change member 31 to declutch it from the transmission member and move it into engagement with the teeth 33 in the stationary clutch member 21. Thereafter, rotation of the driving member 16 rotates the transmission member 13 through the planetary reduction gears at low speed, and this rotation is imparted to the hub 11 through the clutch members 35, 39.

A spring drag ring 25 is fixedly mounted in any suitable manner on the exterior surface of the driving member 16 and bears frictionally on the peripheral flange 26 of the transmission member 13 in order to transmit a slight amount of torque to prevent possible interruption of the shifting movement when the sun gear 31 is in its neutral, disengaged position.

Propulsion of the bicycle in low gear will continue thereafter until such time as load conditions, such as the surmounting of the upgrade, render it desirable to shift back into high gear. To accomplish this, it is merely necessary for the operator to accelerate the bicycle above the critical speed and then back-pedal slightly in order to traverse the driving clutch member 35 back to its high speed position, thereby permitting the speed change member 31 and driven clutch member 39 to be shifted back by their springs 34 and 42 respectively. The latches 45 are then moved inwardly by the centrifugal weights 48 to hold the driven clutch member 39 in its high speed position, and propulsion in high gear may then be resumed.

The application of the brake by backward rotation of the driving member is accomplished in the usual manner as described in the patent to Hood.

Figure 5:
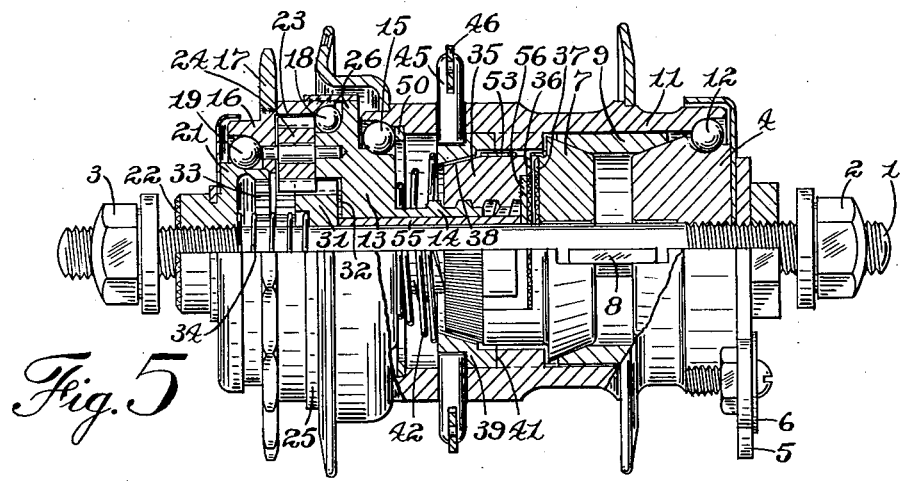
Fig. 5 is a view similar to Fig. 1 showing a second embodiment of the invention.

The embodiment of the invention illustrated in Fig. 5 is substantially similar to the first embodiment, with the exception of the means for transmitting shifting movement from the driving clutch member to the speed change member. In this embodiment, said means is in the form of a sleeve 55 slidably mounted on the axle 1, forming a bearing for the transmission member 13, and a thrust washer 56 attached in any suitable manner to the driving clutch member 35 and engaging the end of the sleeve 55.

The operation of this embodiment of the invention is in all respects the same as that previously described.

Although certain structure has been shown and described in detail, it will be understood that changes may be made in the design and arrangement of the parts without departing from the spirit of the invention.

I claim:

1. In a variable-ratio gear drive for a wheel hub, a fixed axle, a transmission member including a screw shaft journalled on the axle, a driving member rotatably mounted on the transmission member, variable-speed gearing for rotating the transmission member from the driving member including an axially shiftable speed-change member, a driving clutch member threaded on the screw shaft, a driven clutch member splined in the hub in position to be engaged and rotated by the driving clutch member on forward rotation of the screw shaft, means for shifting the speed-change member responsive to axial movement of the driving clutch member, and means for arresting the axial movement of the driven clutch member.

2. A variable-ratio gear drive as set forth in claim 1 in which the means for arresting the axial movement of the driven clutch member comprises an abutment in the hub which defined the low-speed position of the clutch members, and a latch member in the hub for defining the high-speed position of the clutch members.

3. A variable-ratio gear drive as set forth in claim 2 including further, centrifugal means for moving the latch into operative position responsive to rotation of the hub above a predetermined speed.

4. In a variable-ratio gear drive for a wheel hub, a driving member, means for rotating the hub from the driving member including a gear train having an axially shiftable speed-change member and an axially movable driving clutch member, means for transmitting axial movement from the clutch member to the speed-change member, means for preventing such axial movement of the clutch member, and centrifugal means rotatable with the hub for rendering the preventing means operative; including further a driven clutch member splined in the hub in the path of movement of the driving clutch member, said preventing means comprising a latch member movable by said centrifugal means into position to obstruct the axial movement of the driven clutch member.

5. In a variable-ratio gear drive for a wheel hub, a driving member, means for rotating the hub from the driving member including a gear train having an axially shiftable speed-change member and an axially movable driving clutch member, means for transmitting axial movement from the clutch member to the speed-change member, means for preventing such axial movement of the clutch member, and centrifugal means rotatable with the hub for rendering the preventing means operative; in which the axial movement of the driving clutch member shifts the speed-change member from high-speed position to low-speed position; and the centrifugal means is arranged to prevent such shifting movement when the hub is rotating above a predetermined speed; including further a driven clutch member splined in the hub in the path of movement of the driving clutch member, an abutment limiting axial movement of the driven clutch member to thereby define the low-gear position of the clutch members, and yielding means urging the speed-change member and clutch members toward high-speed position; said preventing means comprising a latch member carried by the hub and movable by said centrifugal means into position to hold the driven clutch member in its high-speed position.

References Cited in the file of this patent

UNITED STATES PATENTS 1,837,978        McGavern _____ Dec. 22, 1931